United States Patent Office 2,734,847
Patented Feb. 14, 1956

2,734,847

PERSPIRATION INHIBITING COMPOSITION

Frank M. Berger, Princeton, and Sophie L. Plechner, Metuchen, N. J., assignors to Carter Products, Inc., New York, N. Y., a corporation of Maryland No Drawing. Application August 6, 1952,
Serial No. 303,002

8 Claims. (Cl. 167—90)

This invention relates to perspiration retarding or inhibiting compositions and more particularly to effective compositions for this purpose which incorporate as their active ingredients, compounds of aluminum and zirconium. The terms "perspiration retarding and inhibiting compositions" are used herein to mean compositions the essential action of which is to retard or stop the flow of perspiration from the human skin, and not compositions that merely mask or destroy the odors of or that result from perspiration.

It is desirable to provide compositions that inhibit or retard the flow of perspiration from limited areas of the human skin for limited time intervals. Various compounds have heretofore been proposed for this purpose, among them the water-soluble heavy metal salts of strong mineral acids, typically, aluminum sulfate and aluminum chloride. These compounds, when employed in an aqueous carrier, as they must be for effective action, are irritating to the human skin and destructive to fabrics, particularly when, after exposure to the compounds on the skin, the fabrics are subjected to high temperatures, as in ironing. Numerous attempts have been made to counteract the irritating and corrosive effects of the strong acid salts of heavy metals by adding buffers to them. Many buffers that are effective for this purpose are of undesirable consistency for use in liquids, creams or lotions for application to the skin.

We have discovered that by combining with the heavy metal salts of strong acids, and typically with aluminum sulfate or aluminum chloride, one or more of the relatively soluble zirconium salts of hydroxy aliphatic carboxylic acids, typically sodium zirconium lacetate, sodium zirconium glycolate and sodium zirconium gluconate, there is produced a composition which is more effective in stopping or retarding the flow of perspiration than are known buffered preparations of aluminum sulfate or aluminum chloride containing like amounts of the aluminum salts, while at the same time our new composition is non-irritating to the skin and non-injurious to fabrics.

For effective use, the active ingredients of our improved compositions should be combined in an aqueous carrier, such as water, or the aqueous phase of a cream emulsion or lotion.

The compositions according to our invention are effective over a wide range of proportions as between the aluminum salts and the zirconium salts. Thus, for example, when combining aluminum chloride or aluminum sulfate with sodium zirconium lactate, the proportions may range from about 90% of the aluminum salt with about 10% of the zirconium salt to less than 10% of the aluminum salt with over 90% of the zirconium salt. Similar ranges of proportions may be used in combining aluminum chloride or aluminum sulfate with sodium zirconium glycolate or with sodium zirconium gluconate. We generally prefer to employ such proportions of the essential active ingredients as will produce a composition having a pH value substantially within the range of about 2.5 to about 5.5. Water solutions exhibiting pH values within this range are, for example, obtained by combining the ingredients in the proportions from about 40% aluminum chloride with 60% sodium zirconium lactate to less than 10% aluminum chloride with more than 90% sodium zirconium lactate. When using aluminum sulfate, the desired pH range will be approximated by combining the ingredients in the proportions from about 90% aluminum sulfate with 10% sodium zirconium lactate to between 10 and 20% aluminum sulfate with between 90 and 80% sodium zirconium lactate. The ranges of proportions of the aluminum salts with the other soluble organic zirconium salts which give pH values within the preferred range may be readily determined.

Our improved compositions may be prepared in any desired form, including solutions, emulsions, lotions, creams and the like, which include an aqueous carrier. One useful form comprises simple water solutions of the essential active ingredients. Suitable formulations of water solutions may include from 60 to 85% water and the remainder a mixture of the aluminum salt and the relatively soluble organic zirconium salt in the proportions indicated above. Specific examples of such water solution preparations follow, the ingredients being given in percentage by weight.

*Example I*

| | Percent |
|---|---|
| Sodium zirconium lactate | 5 |
| Aluminum sulfate | 10 |
| Water | 85 |

*Example II*

| | Percent |
|---|---|
| Sodium zirconium lactate | 10 |
| Aluminum chloride | 5 |
| Water | 85 |

*Example III*

| | Percent |
|---|---|
| Sodium zirconium glycolate | 10 |
| Aluminum chloride | 5 |
| Water | 85 |

*Example IV*

| | Percent |
|---|---|
| Sodium zirconium glycolate | 5 |
| Aluminum sulfate | 10 |
| Water | 85 |

Our novel combination of active ingredients can be incorporated into cream bases which will maintain the compositions in contact with the skin over extended periods. The cream base forming materials may vary widely in composition but will generally comprise an oily phase held in dispersion by a suitable emulsifier in an aqueous phase which carries the combined aluminum and zirconium salts, a humectant also preferably being present.

The oily phase of the base may include natural and synthetic oils, waxes and fats, including spermaceti, paraffin, mineral oils, sterols, vegetable oils, and other esters of fatty acids. The emulsifier may comprise any suitable known emulsifying agent, and those found useful include partial esters of fatty acids with glycerine, glycol, or other polyhydric alcohols and their polyoxyethylene ethers, including stabilizers such as sodium salts of sulfated monoglycerides of cocoanut oil fatty acids, sodium alkyl sulfate, salts of alkyl aromatic sulfonates, etc. Specific emulsifiers suitable for use in the cream base include sodium β-oleylethane amid sulfonate (obtainable under the trade name "Igepon T"), soribitan monolaurate, monopalmitate, and monostearate polyoxyethylene derivatives (obtainable under the trade names "Tween 20" to "Tween 80"), alkylated aryl polyether alcohol (obtainable under the trade name "Triton X45"), and the triethanolamine salt of alkyl aryl sulfonate (obtainable under the trade name "Ultrawet 60L"). Suitable humectants include glycerine, sorbitol and propylene glycol.

The following are specific examples of cream preparations incorporating our novel perspiration inhibiting composition, the proportions of ingredients being given in approximate percentages by weight.

Example V

| | Percent |
|---|---|
| Petrolatum | 1 |
| Spermaceti wax | 3 |
| Glycerol monostearate | 13 |
| Glycerine | 10 |
| Triethanolamine salt of alkyl aryl sulfonate | 10 |
| Sorbitan monostearate polyoxyethylene derivative | 3 |
| Water | 44 |
| Titanium dioxide | 1 |
| Sodium zirconium lactate | 5 |
| Aluminum sulfate | 10 |

Example VI

| | Percent |
|---|---|
| Petrolatum | 2 |
| Spermaceti wax | 2 |
| Glycerol monostearate | 9 |
| Glycerine | 12 |
| Polyethylene glycol monostearate | 5 |
| Sorbitan monopalmitate polyoxyethylene derivative | 2 |
| Water | 52 |
| Titanium dioxide | 1 |
| Sodium zirconium lactate | 5 |
| Aluminum sulfate | 10 |

Example VII

| | Percent |
|---|---|
| Petrolatum | 2 |
| Spermaceti wax | 2 |
| Glycerol monostearate | 9 |
| Glycerin | 12 |
| Polyethylene glycol monostearate | 5 |
| Sorbitan monopalmitate polyoxyethylene derivative | 2 |
| Water | 52 |
| Titanium dioxide | 1 |
| Aluminum sulfate | 10 |
| Sodium zirconium glycolate | 5 |

Example VIII

| | Percent |
|---|---|
| Petrolatum | 1 |
| Spermaceti wax | 3 |
| Glycerol monostearate | 13 |
| Glycerine | 10 |
| Triethanolamine salt of alkyl aryl sulfonate | 10 |
| Sorbitan monopalmitate polyoxyethylene derivative | 3 |
| Titanium dioxide | 1 |
| Water | 44 |
| Aluminum chloride | 5 |
| Sodium zirconium lactate | 10 |

Example IX

| | Percent |
|---|---|
| Petrolatum | 1 |
| Spermaceti wax | 3 |
| Glycerol monostearate | 13 |
| Glycerine | 10 |
| Triethanolamine salt of alkyl aryl sulfonate | 10 |
| Sorbitan monopalmitate polyoxyethylene derivative | 3 |
| Titanium dioxide | 1 |
| Water | 44 |
| Aluminum chloride | 5 |
| Sodium zirconium glycolate | 10 |

The relatively soluble organic zirconium salts, although ineffective to inhibit perspiration flow when employed alone or as the sole active ingredients of a preparation, apparently not only prevent both the irritation and fabric injury characteristic of the inorganic aluminum salts alone but also supplement or augment the perspiration inhibiting action of the aluminum salt as well. Thus, we have found that preparations according to this invention containing as their sole active ingredients approximately 10% of aluminum sulfate and 5% of sodium zirconium lactate, or containing about 10% aluminum sulfate with about 5% of sodium zirconium glycolate are at least as effective in stopping perspiration flow as a composition having a similar base and containing as its sole active ingredient about 20% of aluminum sulfate buffered with about 10% of urea.

We claim:

1. A perspiration inhibiting preparation comprising the combination in an aqueous carrier of at least one zirconium salt selected from the class consisting of sodium zirconium lactate, sodium zirconium glycolate and sodium zirconium gluconate and at least one aluminum salt selected from the class consisting of aluminum sulfate and aluminum chloride.

2. A perspiration inhibiting preparation as defined in claim 1, in which the aqueous carrier comprises the aqueous phase of a cream in which an oily phase is held in dispersion by an emulsifier.

3. A perspiration inhibiting preparation comprising the combination in an aqueous carrier of sodium zirconium lactate and an aluminum salt selected from the class consisting of aluminum sulfate and aluminum chloride.

4. A perspiration inhibiting preparation comprising the combination in an aqueous carrier of sodium zirconium lactate and aluminum sulfate.

5. A perspiration inhibiting preparation comprising the combination in an aqueous carrier of sodium zirconium lactate and aluminum chloride.

6. A perspiration inhibiting preparation comprising the combination in an aqueous carrier of sodium zirconium glycolate and aluminum sulfate.

7. A perspiration inhibiting preparation comprising the combination in an aqueous carrier of sodium zirconium glycolate and aluminum chloride.

8. A perspiration inhibiting preparation comprising the combination in an aqueous carrier of sodium zirconium lactate and aluminum sulfate in proportions in the range of from about 90% aluminum sulfate with 10% sodium zirconium lactate to between 10 and 20% aluminum sulfate with between 90 and 80% sodium zirconium lactate.

References Cited in the file of this patent

UNITED STATES PATENTS

| 2,236,387 | Wallace | Mar. 25, 1941 |
| 2,498,514 | Van Mater | Feb. 21, 1950 |